United States Patent

Glagolev et al.

[11] 4,014,494
[45] Mar. 29, 1977

[54] COLD BUTT-WELDING MACHINE

[76] Inventors: Nikolai Alexeevich Glagolev, ulitsa Tagilskaya, 20a; Gennady Alexeevich Klimenko, ulitsa I, Izhakevicha, 7/10, kv. 71; Anatoly Ivanovich Chvertko, Bulvar Lesi Ukrainki, 2, kv. 39, all of Kiev; Boris Ivanovich Kononets, ulitsa Ostrovskogo, 2, Brovary Kievskoi oblasti; Pavel Ivanovich Gursky, Bulvar Lesi Ukrainki, 2, kv. 58, Kiev; Vladimir Alexandrovich Nosachev, ulitsa Vavilova, 19, kv.5, Zaporozhie; Leonid Grigorievich Kravchenko, ulitsa Admiralteiskaya, 7, kv.8, Zaporozhie; Valentin Georgievich Basov, ulitsa Ulyanova, 19, Zaporozhie; Larisa Evgenievna Bogomolova, ulitsa Krasnoarmeiskaya, 129, kv.16, Kiev; Viktor Andreevich Ivanov, ulitsa Vesnina, 11, kv.1, Zaporozhie; Konstantin Konstantinovich Khrenov, ulitsa Cheljuskintsev, 15, kv.11, Kiev, all of U.S.S.R.

[22] Filed: July 5, 1974

[21] Appl. No.: 486,206

[52] U.S. Cl. .................. 228/3.1; 228/5.7; 228/13
[51] Int. Cl.[2] ........................ B23K 21/00
[58] Field of Search .............. 228/1, 3, 4, 5, 13, 228/44, 115, 116, 170, 3.1, 5.1, 44.1; 29/470, 470.1

[56] References Cited

UNITED STATES PATENTS 3,093,018   6/1963   Rozmus ............... 228/115 X

FOREIGN PATENTS OR APPLICATIONS 6,652   3/1967   Japan ................... 228/115

Primary Examiner—Al Lawrence Smith
Assistant Examiner—K. J. Ramsey

[57] ABSTRACT

Machine for cold butt welding of metal blanks, wherein one of the blank clamping devices mounts on its housing a carriage with blades for cutting off the ends of the blanks, adapted for possible displacement in the direction of the force upsetting the blanks to position these blades at such distances from the device housings that assure the upsetting of an amount of metal as needed for the welding. The machine is provided with guide members carrying blank clamping devices, single-endedly fixed, that is in a cantilever fashion, in a power drive housing installed on a bed of the machine and adapted for set turning in at least one vertical plane in relation of the upsetting force. The blanks may be in different relationships in space. The invention can be successfully employed in welding aluminum and copper blanks of any cross-sectional shapes: circular, square, rectangular, rhombic, etc. The present machine is particularly effective in the operations of extending the ends of electric motor windings, in coiling high-capacity power transformers, producing continuous wires, welding multicore cables, etc. The machine assures axial alignment of blanks at their placement in clamping devices and during upsetting, and is also adapted for welding metal blanks having at least one flat surface on their perimeter.

6 Claims, 6 Drawing Figures

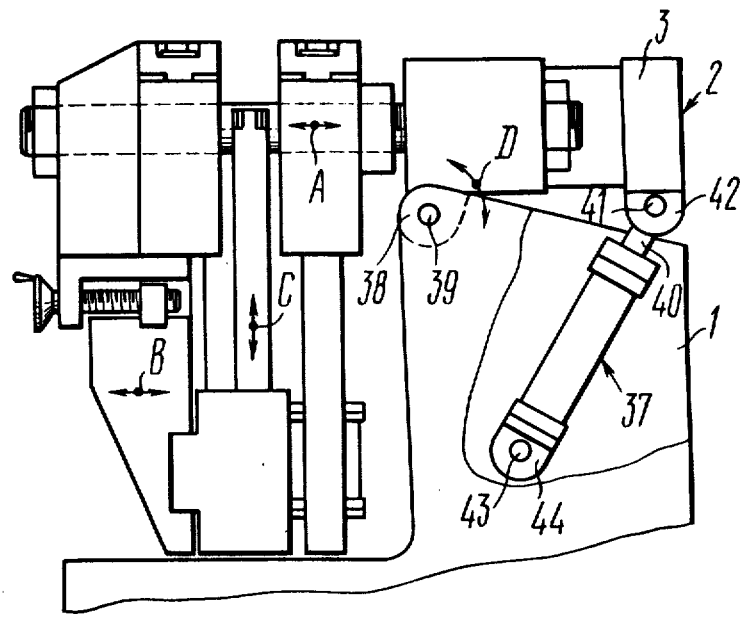

COLD BUTT-WELDING MACHINE

The present invention relates to welding equipment and more exactly to cold butt-welding machines.

The invention can be utilized for cold butt welding of aluminum and copper blanks in combinations: aluminum + aluminum, copper + copper and aluminum + copper. These blanks may be of any cross section: circular, square, rectangular, rhombic, etc.

The application of the present invention is particularly effective in operations of extending the ends of windings of high-capacity power transformers, in producing continuous wires, in welding multicore cables, etc.

There is a generally known machine for cold butt-welding of metal blanks. This known machine is intended for producing continuous wires by way of welding.

The machine comprises a bed which mounts a blank upsetting mechanism with a power drive enclosed in a housing. The upsetting mechanism has guide members and two blank clamping devices with their housings mounted on the guide members so that one device is stationary while the other device is adapted for displacement, when actuated by the power drive, in the direction of the upsetting force. Blades are installed between the housings of the clamping devices for cutting off the ends of the blanks being welded, the blades having a drive for displacement in a vertical plane, normal to the direction of the upsetting force.

Each clamping device incorporates two half-dies to accommodate one of the blanks to be welded, and an individual drive for closing the half-dies. In this arrangement, one of the half-dies is connected to the closing drive, while the other half-die is rigidly secured on the housing of the respective device. The closing drive is made in the form of a hydraulic cylinder with a six-link leverage operating as a toggle lever. Movement of the rod of this hydraulic cylinder results in the displacement of the half-die connected to the closing drive.

The drive for the earlier-mentioned displacement of the blades in the vertical plane normal to the direction of the upsetting force is also made in the form of a hydraulic cylinder with a telescopic rod. The rod of this hydraulic cylinder mounts the blades, while its housing is stationary, and is secured on the machine bed. Cutting off the allowance of the blanks to be welded and removal of the blades from the cutting-off zone (downward displacement of the blades) are effected by the movement of the cylinder rod.

The power drive is represented by an upsetting hydraulic cylinder installed in the housing, rigidly secured on the bed. The guide members are connected through one of their ends to the housing of this hydraulic cylinder, and through the other ends to the bed of the machine.

Adjusting elements are positioned at the places where the guide members are secured to the bed. During upsetting, these adjusting elements take up the upsetting force. The presence of such adjusting elements causes undesirable elastic deformations in the structure of the stationary clamping device which is secured on the guide members, and reduces rigidity of its mounting on the bed, which results in axial misalignment of the blanks both during their positioning in the device and during upsetting. Axial misalignment impairs the quality of the cold welded joint and often leads to lack of penetration. Due to the above reasons the known machine is not able to assure stable and quality connections of the blanks to be welded.

Since the hydraulic cylinder of the upsetting mechanism, the cylindrical guide members and the housing of the cutting-off hydraulic cylinder are rigidly mounted on the bed, the known machine can not be used for welding metal blanks which are in different relationships in space, for example, in welding a rectangular-section winding wire in the course of coiling windings of power transformers.

The known machine has a low efficiency in extending the ends of armature windings of electric motors. In this case, the blanks to be welded are represented by busbars. A wide variety of busbars increases the time period needed for preparing the clamping devices for the welding operation and requires thorough alignment of the busbars positioned in these devices.

The principal object of the present invention is to provide a machine for cold butt welding of metal blanks, which assures the axial alignment of blanks during their placement in the clamping devices and in the course of their upsetting.

Another object of the invention is to provide a cold butt-welding machine which permits welding of metal blanks which are in varied spatial relationships to each other.

One more object of the present invention is to provide a cold butt-welding machine capable of producing a stable and quality-welded joint.

These and other objects of the invention are achieved by provision of a machine for cold butt welding of metal blanks, comprising a blank upsetting mechanism mounted on a machine bed with a power drive enclosed in a housing and having guide members and two blank clamping devices with their housings installed on the guide members so that one device is stationary, while the other is mounted for possible displacement by means of the power drive in the direction of the upsetting force.

Between the housings of the devices, blades are installed for cutting off the ends of the blanks being welded, the blades being provided with a drive for their displacement in a vertical plane, normal to the direction of a substantially horizontal upsetting force. Each clamping device incorporates two half-dies to accommodate one of the blanks to be welded, and an individual drive to close them.

According to the invention the housing of one of the clamping devices mounts a carriage displaceable in the direction of the upsetting force, with blades being fixed thereon for cutting off the ends of the blanks to be welded, while the guide members are secured single-endedly or in a cantilever fashion in the housing of the power drive, in the direction of the upsetting force, installed on the machine bed for possible set turning in at least one vertical plane, in the direction of the upsetting force, at varied spatial positions of the blanks for cutting off their ends, and for subsequent welding.

The invention makes it possible to assure the axial alignment of blanks to be welded during their placement in the clamping devices and in the course of their upsetting, due to a higher rigidity of the structure achieved because one of the devices mounts the carriage with the cutting off means, and the guide members are single-endedly secured.

In this case there are not adjusting elements which would take the upsetting force, thus leading to elastic deformations to reduce the rigidity of the structure and impair the alignment of the blanks being welded.

In this way, the principal task of producing a stable and quality cold welded joint of metal blanks is accomplished.

In addition, the present machine makes it possible to weld together blanks which are in varied spatial positions, due to installing the power drive housing on the bed for a possible set turning in different vertical planes.

For set turning of the power drive in a vertical plane, passing in the direction of the upsetting force, it is recommended to pivotally connect the power drive housing to the bed and mechanically connect it to a movable element of a hydraulic cylinder that is installed on the bed for a possible pendulum motion. This additional feature may be utilized in welding a winding wire in the course of coiling the fish windings of power transformers on horizontal winding machines.

For welding a winding wire in the course of the coiling of such fish windings on vertical winding machines, provision should be made for set turning of the power drive in a vertical plane, normal to the direction of the upsetting force.

In this case, the set turning can be achieved with the help of a shaft which mounts the power drive housing and which is positioned parallel with the upsetting force in supports rigidly secured on the bed, and which has a self-contained drive for rotation about its axis.

For a more efficient operation of the machine when welding a winding wire in the course of coiling power transformers it is expedient to accomplish the set turning of the power drive in mutually perpendicular vertical planes with the help of a plate, pivotally connected at one edge on the bed, and the other end mechanically connected to a movable element of a hydraulic cylinder installed on the bed for a possible pendulum motion, and connected to the power drive housing by means of a shaft which mounts this housing and which is installed in parallel to the upsetting force in supports rigidly secured on the plate, the shaft having a self-contained drive for rotation about its axis.

In order to make the present invention more readily understood an exemplary embodiment thereof will now be described in more detail, with reference to the accompanying drawings in which:

FIG. 3 is a general view of a machine with the upsetting mechanism pivotally installed on the bed;

FIG. 4 illustrates the same, but with the upsetting mechanism installed on a shaft.

The inventive machine for cold butt welding of metal blanks comprises the following main units: a bed 1 (FIG. 1, 2, 3, 4), a mechanism for upsetting blanks to be welded, and means for cutting off the ends of blanks before welding. The bed 1 is a welded frame structure.

Figure 6:
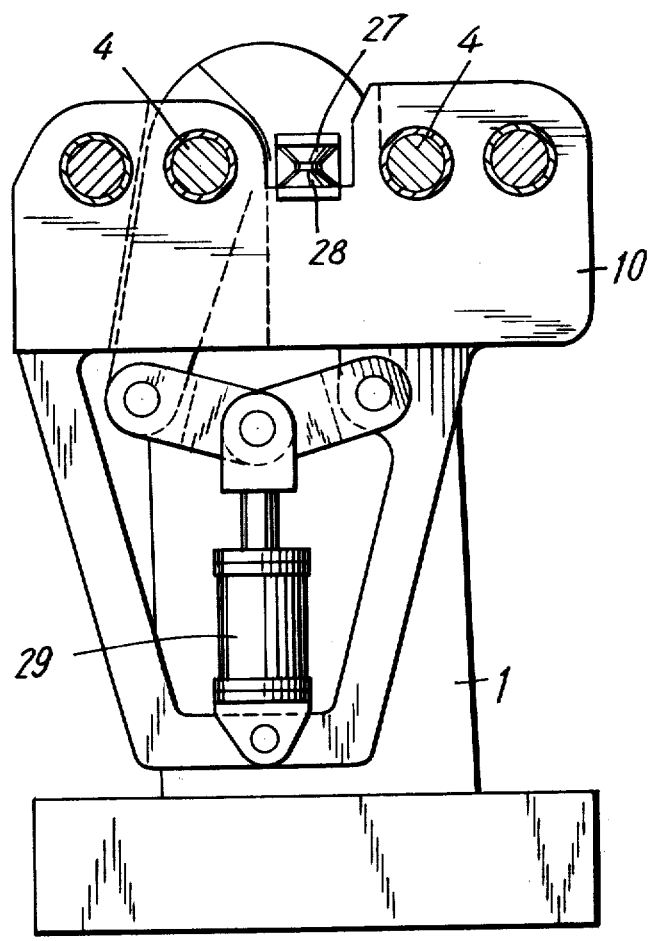
FIG. 6 is a vertical section of the machine along the line VI — VI of FIG. 1.

The upsetting mechanism is installed on the bed 1 to comprise: a power drive 2 with a housing 3, two parallel cylindrical guide members 4 (see also FIG. 6) and two blank clamping devices 5, 6. Device 5 is stationary while 6 is movable as shown by arrows A.

The power drive 2 is actually an upsetting hydraulic cylinder installed in the housing 3 mounted on the bed 1 for possible set turning in vertical planes in relation to the direction of the upsetting force.

The axes of the cylindrical guide members 4 are in a common plane with the direction of a substantially horizontal upsetting force developed by a hydraulic cylinder 7 of the power drive 2, as can be seen in FIGS. 1 and 3 through 5.

For welding continuous blanks it is convenient to use two hydraulic cylinders. This solution fully eliminates the necessity of bending a blank before welding to align the longitudinal axis of this blank with the direction of the upsetting force.

The guide members 4 are single endedly secured in the housing 3 of the upsetting mechanism by means of a threaded joint 8.

Figure 1:
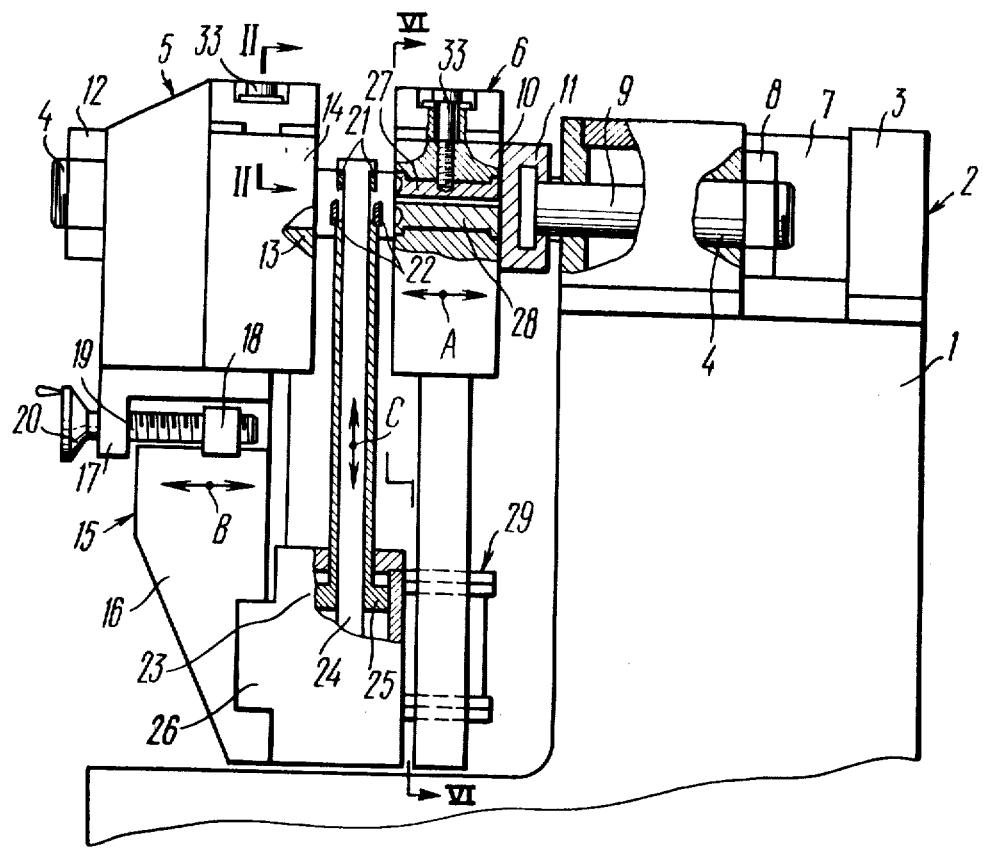
FIG. 1 is a schematical representation (partly broken) of a machine for cold butt welding for metal blanks, wherein an upsetting mechanism is rigidly installed on a bed.

The above mentioned guide members 4 mount the devices 5, 6; as mentioned before, device 5 is stationary, while the other 6 is movable in the direction indicated by arrow A in FIG. 1 of the upsetting force by means of the power drive 2 of the upsetting mechanism. The movement is produced by a rod 9 of the hydraulic cylinder 7, the rod being connected to a housing 10 of the clamping device 6 by means of an adapting cross member 11. This connection can also be made through a linkage.

Stationary fixing of the clamping device 5 is achieved by means of a threaded joint 12 and a shoulder 13, both provided at the cantilever end of the guide members 4. The clamping device 5 is positioned between the shoulder 13 and a nut of the threaded joint 12, enclosed in its own housing 14.

The machine according to the invention comprises a carriage 15 mounted on the housing 14 of the clamping device 5 and including a movable portion 16 and a stationary portion 17.

The movable portion 16 of the carriage 15 is capable of displacement, also in the direction of the upsetting force (indicated by arrow B in FIG. 1) and mounts the blank cutting off (dressing) means thereon.

The referred displacement of the movable portion 16 of the carriage 15 is effected by means of a screw pair in which a nut 18 is rigidly fixed in the movable portion 16 of the carriage 15, while a screw 19 is fixed on the stationary portion 17 of the carriage 15, the latter portion being rigidly fixed on the housing 14 of the clamping device 5, and the free end of the screw carries a handwheel 20 to effect manual displacement of the movable portion 16 of the carriage 15.

The blank cutting-off means is arranged with two pairs of shears whose blades 21 and 22 are positioned between the housings 10 and 14 of the clamping devices 6 and 5 respectively and provided with a drive 26 for their displacement in a vertical plane, perpendicular to the direction of the upsetting force. This drive takes the form of a hydraulic cylinder 23 whose rod is telescopic to include a male 24 and a female section 25.

The female section 25 of the telescopic rod carries the blades 22 on whose cutting edges the blanks are placed by resting them against the male section 24 of the telescopic rod. Blades 21 are fixed on the male section 24 of said rod. Blades 21 and 22 are installed on the telescopic rod so that a clearance between their cutting edges is equal to 0.02–0.1 of the diameter or thickness of the blanks to be welded.

Location of the blank cutting-off means on the movable portion 16 of the carriage 15 permits positioning of the blades 21, 22 at such distances from the blank clamping devices 5, 6 that assure the upsetting of an amount of metal as required for welding, to be determined by the protrusion of the blanks from the clamping devices 5, 6 up to the cutting edges of the blades 22.

The hydraulic cylinder 23 is arranged so that when the male section 24 of the telescopic rod is displaced, the ends of the blanks are cut off, while at simultaneous displacement (indicated by arrow C in FIG. 1) of the male 24 and the female sections 25 the blades 21, 22 are removed from the welding zone.

To position the blades 21, 22 at given distances from the housings 10, 14 of the clamping devices 6, 5 respectively, the housing of the hydraulic cylinder 23 is provided with a protrusion 26 coming into a recess of the movable portion 16 of the carriage 15.

Each clamping device 5, 6 incorporates two half-dies 27 and 28 (see FIG. 2); to accommodate blanks to be welded and a drive 29 (FIG. 1) for closing the half-dies. The just described elements 27, 28 and 29 can be seen on a somewhat larger scale in FIG. 6. To simplify the drawings; the half-dies positioned in the clamping device 5, and the drive for their closing, are not further shown in detail.

The half-dies 27 are mechanically linked with the respective closing drives 29, while the half-dies 28 are rigidly secured on the housing 10 and 14 of the clamping devices 6, 5 respectively.

Blank accommodating spaces 31 in the half-dies 27 and 28 are oriented so that the cutting edges of the blades 21 and 22 are perpendicular to the longitudinal axes of blanks to be welded along their protrusion from the devices up to the cutting edges of the blades 22.

For more efficient use of the machine and higher quality of welding blanks having one flat surface, the halfdies 27 linked with the closing drives 29 are made with flat working surfaces 30 (FIG. 2), while the other half-dies 28, rigidly secured in the housings 10 and 14 of the clamping devices 6, 5 respectively, are made with the blank spaces 31, so that in the course of clamping, the flat surfaces of the blanks are in contact with the flat working surfaces 30 of the half-dies 27. The spaces 31 are oriented in relation to the cutting edges of the blades 21 and 22 in a way described above.

This design of the half-dies is preferably used for welding blanks which are similar in their cross-sectional shapes, but widely vary in size, for example busbars or the like. In this case the half-die 27 with a flat surface is constantly fixed in the clamping device housing to reduce the time period needed for preparing the machine for welding blanks of other sizes and to improve the structural rigidity of the clamping device, with a resultant higher quality of welding.

To prevent non-uniform wear of the flat working surfaces 30 the half-dies 27 are given spherical surfaces 32 through which they contact the surfaces of the housings 10 and 14. Such conjugation of the half-dies 27 with the housings is consequently articulated to permit self-positioning of the flat working surfaces 30 on the flat surfaces of the blanks to be welded when the half-dies 27 and 28 are closed.

Screws 33 are provided to hold the half-dies 27 in the housings 10 and 14 of the clamping devices 6 and 5 respectively.

Rigid mounting of the half-dies 28 in the housings 10 and 14 of the clamping devices 6, 5 respectively, is achieved by means of wedges 34 located in recesses 35 of the housings 10 and 14 in such a way that inclined surfaces 36 of the wedges 34 are in contact with the outer surfaces of the half-dies 28, which are also inclined.

The power drive 2 of the upsetting mechanism is mounted on the bed 1 for possible set turning in vertical planes in relation to the direction of the upsetting force at varied spatial positions of the blanks to be welded.

For set turning (indicated by arrow D in FIG. 3) of the power drive 2 of the upsetting mechanism in a vertical plane, passing in the direction of the upsetting force, the housing 3 of the power drive 2 may be pivotally connected with the bed 1 and mechanically connected with a movable element of a hydraulic cylinder 37 (FIG. 3) installed on the bed 1 for a possible pendulum motion.

Pivoted connection of the power drive 2 with the bed 1 is arranged with lugs 38 of the bed 1 through which an axle 39 is inserted to mount the housing 3 of the power drive 2.

The movable element of the hydraulic cylinder 37 is a rod 40. Mechanical connection of the rod 40 with the power drive 2 is effected by means of an axle 41 connected to the rod 40 and fixed in lugs 42 of the housing 3.

To effect pendulum motion of the hydraulic cylinder 37 the bed 1 is given a pivoted joint with an axle 43 fixed on the bed 1 to mount the hydraulic cylinder 37 by means of lugs 44.

For set turning (indicated by arrow E in FIG. 4) of the power drive 2 in a vertical plane, perpendicular to the direction of the upsetting force, the machine may be provided with a shaft 45 (FIG. 4) installed in parallel relationship with the direction of the upsetting force (see arrow A). Rigidly secured on the shaft 45 is the housing 3 of the power drive 2 of the upsetting mechanism. The shaft 45 is installed in supports 46 rigidly fixed on the bed 1. The shaft 45 is turned about its axis by a drive in the form of a worm pair in which a worm segment 47 is fixed on the shaft 45, while a worm 48 is connected with a handwheel (not shown) for manual turning.

For set turning (indicated by arrow K in FIG. 5) of the power drive 2 in inter-perpendicular vertical planes the machine may be provided with a plate 49 (FIG. 5) pivotally connected with one edge on the bed 1, and mechanically connected with the other edge to a movable element 50 which is a rod of a hydraulic cylinder 51. The hydraulic cylinder 51 is installed on the bed 1 for possible pendulum motion due to a pivoted joint with an axle 52 fixed on the bed 1, to mount the hydraulic cylinder 51 by means of lugs 53 made on its housing.

The plate 49 is connected to the housing 3 of the power drive 2 by means of a shaft 54 which mounts this housing 3. The shaft 54 itself is installed in parallel relationship with the direction of the upsetting force (arrow A) in supports 55 rigidly secured on the plate 49.

For turning around its axis the shaft is provided with a drive in the form of a worm pair in which a worm segment 56 is fixed on the shaft 54, while a worm 57 is connected to a handwheel (not shown) for manual turning.

The pivoted joint of the plate 49 with the bed 1 includes an axle 58 fixed on the bed 1 to freely pass through lugs 59 made in the plate 49.

Mechanical connection of the rod 50 of the hydraulic cylinder 51 with the plate 49 includes an axle 60 connected to the rod 50 and mounted in lugs 61 also made in the plate 49.

Figure 5:
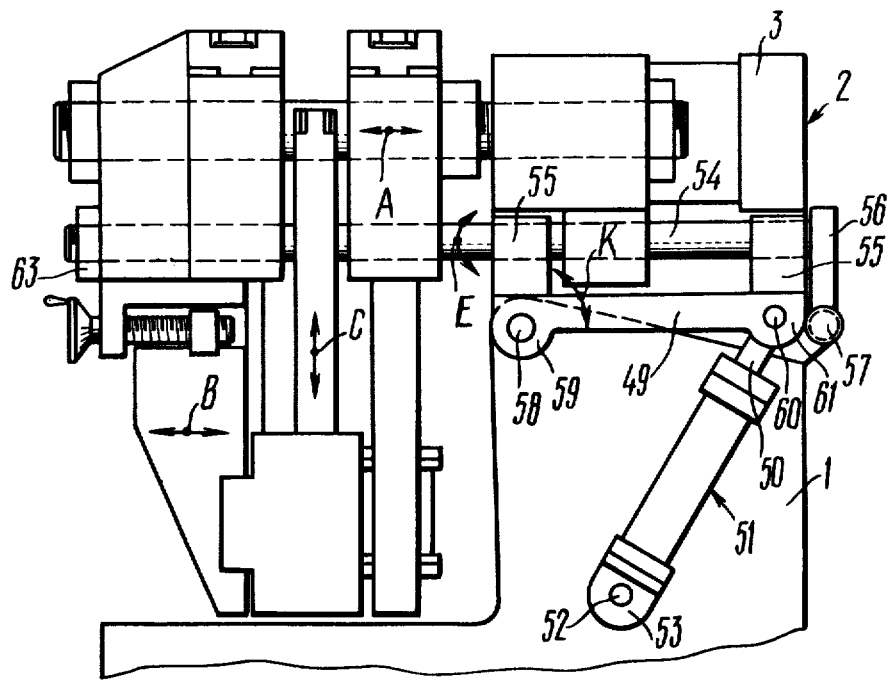
FIG. 5 illustrates the same, but with the upsetting mechanism installed on the bed by means of a shaft and a plate.

Referring to FIGS. 4 and 5, to bring more rigidity to the structure, holes may be made in the housings 14, 10 of the clamping devices 5 and 6, which holes are in coaxial relationship with each other to freely insert the shafts 45 and 54 rigidly fixed on the housing 14 of the device 5 by means of respective nuts 62, 63.

The cold butt-welding machine operates as follows. The machine is shown in the initial position in FIG. 1. Clamping devices 5, 6 are positioned away from the cutting edges of the blades 21, 22 at distances needed for upsetting an amount of metal required for welding of blanks.

Figure 2:
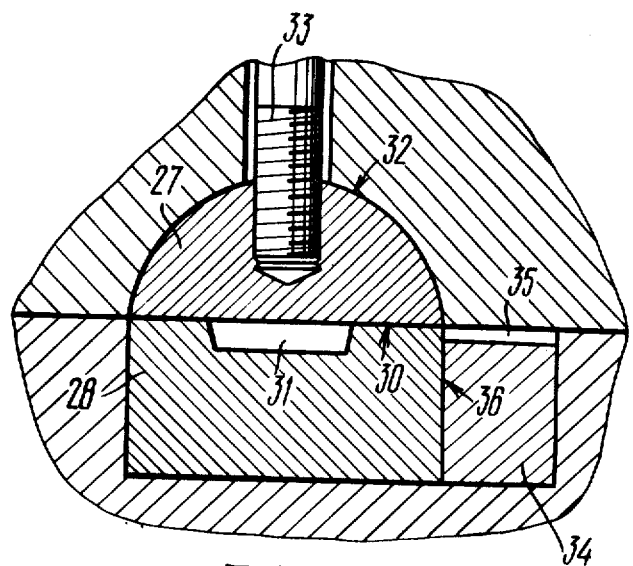
FIG. 2 is a sectional view taken along the line II—II of FIG. 1 to illustrate half-dies.

The half-dies 27 mechanically linked with the closing drives 29 are moved aside so as to permit placement of blanks in their spaces 31 (see FIG. 2).

The machine performs the following main welding operations: clamping of blanks; cutting off an allowance at the ends of blanks (preparation of the surface for welding); upsetting; ejection of welded blanks from the half-dies 28 of the clamping devices 5, 6.

Blanks to be welded are placed manually in the spaces 31 of the half-dies 28 of both devices 5, 6. The ends of the blanks are manually set to rest against the male housing 24 of the telescopic rod. Now, the power drives 29 are actuated for closing dies 27, 28 of each device 5, 6. Blanks are clamped by the half-dies 27, 28.

In the course of clamping, the flat surfaces 30 of the half-dies 28 due to the spherical surfaces 32 are self-positioning on the flat surfaces of the blank to be welded. Then follows actuation of the hydraulic cylinder 23 of the blank end cutting-off means.

Movement of the telescopic rod of the hydraulic cylinder 23 is accompanied with cutting an allowance off the ends of blanks by means of the blades 21, 22 with subsequent removal of the blades 21, 22 from the welding zone. Thus the ends of the blanks are made ready for welding.

This is followed by actuation of the power drive 2 of the upsetting mechanism. Due to the action of the rod 9 of the hydraulic cylinder 7 the device 6 is displaced along the guide members 4 in the direction of the upsetting force. Upsetting an amount of metal needed for welding takes place to produce a welded joint in the course of this operation. Then the half-dies 27 are moved away from the halfdies 28 by means of the drive 29. By the action of the rod 9 of the hydraulic cylinder 7 the device 6 is moved back to the initial position. The hydralic cylinder 23 is actuated for reverse stroke. Movement of the telescopic rod of the hydraulic cylinder 23 forces blades 21, 22 to raise to the initial position. This is accompanied with the ejection of welded blanks from the spaces 31 of the both clamping devices 5 and 6 by the male housing 24 of the telescopic rod.

Welded blanks are manually taken away, the machine being ready for a next welding cycle.

Adjustment of the machine for welding blanks of other size and section is performed as follows. Depending on the cross-sectional shapes of blanks to be welded, the pairs of blades 21, 22 and half-dies 27, 28 are replaced with those needed. If there is flat surface on the blanks only the half-dies 28 are subject to replacement. For this purpose, the wedge 34 is removed from the housings 10 and 14, half-dies 28 are inserted and rigidly secured by means of the wedge 34.

Adjustment of the distance between the blades 21, 22 and the devices 5 and 6 is performed manually through the screw pair 18, 19 by means of the handwheel 20. This displaces the movable portion 16 of the carriage 15 and consequently the blades 21, 22 to set these blades 21, 22 at the required distance from the stationary fixed device 5. Then, the power drive 2 of the upsetting mechanism is actuated. Due to the displacement of the rod of the hydraulic cylinder 7 the device 6 is displaced along the guide members 4 and set at the required distance in relation to the blades 21, 22. The machine is ready for welding blanks of other sizes and sections.

Whenever necessary the power drive 2 is turned in the following manner. To turn the power drive 2 in a vertical plane the hydraulic cylinder 37 is actuated. Displacement of the rod 40 of the hydraulic cylinder 37 makes the housing 3 of the power drive 2 turn around the axle 39. The plate 49 is turned in a similar way by means of the rod 50 of the hydraulic cylinder 51.

To turn the power drive 2 the worm 48 should be rotated to turn the worm segment 47. This makes the shaft 45 turn around its geometric axis together with the housing 3 of the power drive 2.

It proceeds from the above that the cold butt-welding machine is capable of welding blanks which are in varied spatial positions while assuring axial alignment of the articles (blanks) being welded. This machine is particularly advantageous as compared with known machines of the similar type in welding a winding wire in the course of coiling fish windings of power transformers on horizontal and vertical winding machines, as well as in welding blanks which are of similar cross-sectional shape, but widely variable in size, for example, busbars.

In addition, this machine when equipped with automatic control units permits full automation of a welding cycle including the preparation of blanks for welding, several upsetting operations, removal of fins and ejection of welded blanks from clamping devices. Quality control of a cold welded joint is maintained in the course of an automatic welding cycle for absolute reliability of welding blanks in this machine.

We claim:

1. A machine for cold butt welding of metal blanks, comprising: a machine bed; a mechanism for upsetting blanks, installed on said bed and including a power drive and a housing, the latter being installed on said bed with means for possible set turning in at least one vertical plane in relation to the direction of a substantially horizontal upsetting force; substantially horizontal guide members single-endedly fixed in said housing; two devices for clamping the blanks, with respective housings, installed on said guide members, so that one device is stationary while the other device is displaceable in the direction of the substantially horizontal upsetting force by means of said power drive; a carriage installed on said housing of the one clamping device; including movable and stationary portions, the former displaceable in the direction of the upsetting force; blades for cutting off the ends of the blanks, installed on portions of said carriage portruding between said housing of the clamping devices; a drive for displacing said blades in a vertical plane perpendicular to the direction of the upsetting force; two half-dies to accommodate one of the blanks to be welded, respectively positioned in said clamping devices; and individual drives for closing said half-dies.

2. The machine as defined in claim 1, wherein said housing of the power drive is pivotally connected to said bed and mechanically connected to a movable element of a hydraulic cylinder installed on said bed and adapted for a pendulum motion, for the set turning of said power drive in a vertical plane passing in the direction of the upsetting force.

3. The machine as defined in claim 1, further comprising a shaft to mount said housing of the power drive, for the set turning of said power drive in a vertical plane perpendicular to the direction of the upsetting force, said shaft being installed parallel with the direction of the upsetting force in supports rigidly fixed on said bed, said shaft being provided for an individual drive for rotation about its axis.

4. The machine as defined in claim 3, wherein said shaft passes through coaxial holes made in said housings of the clamping devices and is rigidly secured with its one end on said housing of the one clamping device.

5. The machine as defined in claim 1, further comprising a plate pivotally connected by one edge with said bed, for the set turning of said power drive in mutually perpendicular vertical planes, while said plate is mechanically connected with the other edge to a movable element of a hydraulic cylinder installed on said bed for a pendulum motion and connected to said housing of the power drive by means of a shaft on which said power-drive housing is fixed and which is installed parallel with the direction of the upsetting force in supports rigidly secured on said plate, said shaft having a self-contained drive for rotation about its axis.

6. The machine as defined in claim 5, wherein said shaft passes through coaxial holes made in said housings of the clamping devices and is rigidly secured with its one end on said housing of the one clamping device.

* * * * *